United States Patent
Conrad

(10) Patent No.: US 8,349,428 B2
(45) Date of Patent: Jan. 8, 2013

(54) RESISTIVELY WELDED PART FOR AN APPLIANCE INCLUDING A SURFACE CLEANING APPARATUS

(75) Inventor: Wayne Ernest Conrad, Hampton (CA)

(73) Assignee: G. B. D. Corp., Nassau (BS)

( * ) Notice: Subject to any disclaimer, the term of this patent is extended or adjusted under 35 U.S.C. 154(b) by 240 days.

(21) Appl. No.: 12/675,590

(22) PCT Filed: Aug. 28, 2008

(86) PCT No.: PCT/CA2008/001529
§ 371 (c)(1),
(2), (4) Date: Feb. 26, 2010

(87) PCT Pub. No.: WO2009/026708
PCT Pub. Date: Mar. 5, 2009

(65) Prior Publication Data
US 2010/0243158 A1   Sep. 30, 2010

(30) Foreign Application Priority Data
Aug. 29, 2007 (CA) ........................ 2599303

(51) Int. Cl.
*B32B 3/02* (2006.01)
*B32B 37/06* (2006.01)
(52) U.S. Cl. .................. 428/57; 428/53; 428/157
(58) Field of Classification Search .............. 428/57, 428/53, 157
See application file for complete search history.

(56) References Cited

U.S. PATENT DOCUMENTS

| | | | |
|---|---|---|---|
| 3,095,112 A * | 6/1963 | Weinstein et al. | 220/613 |
| 3,320,727 A | 5/1967 | Farley et al. | |
| 3,582,616 A | 6/1971 | Wrob | |
| 4,373,228 A | 2/1983 | Dyson | |
| 4,826,515 A | 5/1989 | Dyson | |
| 5,230,722 A | 7/1993 | Yonkers | |
| 5,309,601 A | 5/1994 | Hampton et al. | |
| 5,392,963 A * | 2/1995 | Kelly et al. | 222/325 |
| 5,858,038 A | 1/1999 | Dyson et al. | |
| 6,221,134 B1 | 4/2001 | Conrad et al. | |
| 6,553,612 B1 | 4/2003 | Dyson et al. | |
| 6,560,818 B1 | 5/2003 | Hasko | |
| 6,581,239 B1 | 6/2003 | Dyson et al. | |
| 6,782,585 B1 | 8/2004 | Conrad et al. | |
| 7,222,393 B2 | 5/2007 | Kaffenberger et al. | |
| 2004/0216268 A1* | 11/2004 | Kaffenberger et al. | 15/415.1 |

FOREIGN PATENT DOCUMENTS

| | | |
|---|---|---|
| GB | 2163703 | 3/1986 |
| JP | 2000140533 A | 5/2000 |
| WO | 00/78546 A1 | 12/2000 |

* cited by examiner

*Primary Examiner* — Brent O'Hern
(74) *Attorney, Agent, or Firm* — Bereskin & Parr LLP/S.E.N.C.R.L., s.r.l.; Philip C. Mendes da Costa

(57) ABSTRACT

A part for an appliance, such as a surface cleaning apparatus, a method of making the part, and a method of disassembling the part are disclosed. The part comprises at least first and second plastic members resistively welded together. In some embodiments, the plastic members define a fluid flow cavity, such as a portion of the air flow path through the surface cleaning apparatus.

14 Claims, 10 Drawing Sheets

RESISTIVELY WELDED PART FOR AN APPLIANCE INCLUDING A SURFACE CLEANING APPARATUS

FIELD OF THE INVENTION

The invention relates to an appliance such as a surface cleaning apparatus, a power tool, a garden tool and a kitchen appliance. In one particular aspect, the invention relates to a part having resistively welded members.

BACKGROUND OF THE INVENTION

Surface cleaning apparatuses, such as vacuum cleaners, typically comprise a dirty fluid inlet, a clean fluid outlet, and a fluid flow path extending therebetween. A cleaning element is positioned in the fluid flow path for removing dirt from the fluid. Known cleaning elements include cyclonic cleaning elements, and filter members such as filters and bags. A motor is typically provided in the fluid flow path for drawing fluid in through the dirty fluid inlet, and out through the clean fluid outlet.

The fluid flow path and housings of known vacuum cleaners may consist of numerous parts, at least some of which are typically fabricated by molding two or more mating plastic members and subsequently securing the mating members together by screws, rivets or the like. Accordingly, the mating plastic members are provided with screw ports, typically on the periphery of the mating parts.

As the screws hold the mating parts together, forces applied to the part made from the mating members are unevenly distributed, and are concentrated around the screw ports. This can lead to failure of the part, for example by cracking in the vicinity of the screw port. In order to address this problem, such mating plastic members are typically provided with integral ribs, which extend around the interior of the conduit between the screw ports, and reinforce the plastic members. Further, the thickness of the part in the vicinity of the screw ports may be increased.

SUMMARY OF THE INVENTION

In one broad aspect, a part for a surface cleaning apparatus is provided. The surface cleaning apparatus has a dirty fluid inlet, a clean fluid outlet and a fluid flow path extending therebetween. The part comprises at least first and second weldable members resistively welded together and defining a cavity. The cavity has at least one inflow port and at least one outflow port. The part forms a portion of the fluid flow path. Accordingly, the part is connectable in fluid flow communication with the fluid flow path to form part of the fluid flow passage.

In another broad aspect, a part for an appliance, such as a surface cleaning apparatus is provided. The part comprises at least first and second weldable members resistively welded together. Each of the first and second weldable members has a perimeter, and the parts are joined along the perimeter. At least one conductive member is disposed between the first and second weldable members, and extends along the perimeter from a first position to a second position.

Embodiments in accordance with this broad aspect may be advantageous because the first and second weldable members may be sealingly joined together. That is, due to the resistive welding, the joint between the weldable members may form a fluid tight seal. Accordingly, pressure losses that occur due to air leaks in the fluid flow path may be minimized or reduced. Thus, for a given strength of motor, the surface cleaning apparatus may provide a higher level of suction, and be more efficient.

In a preferred embodiment, at least one of the first and second weldable members, and preferably both, has an absence of screw ports. Such embodiments may be advantageous because high concentration of stresses around the screw ports may cause a part to crack. If the part forms part of an fluid flow path, then the crack will allow fluid to flow through the surface of the part. If the fluid flow path is under pressure, a fluid such as water is being pumped through a carpet extractor, then this may cause the part to leak. If the fluid flow path is under vacuum, e.g., air is being drawn through an air flow path of a vacuum cleaner upstream of a suction motor, then air may be drawn into the fluid flow path through the crack and decrease the suction and air flow velocity at the inlet of the fluid flow path, thereby decreasing the cleaning efficiency of a vacuum cleaner.

Accordingly, if screw ports are not used, then there will be a reduction of point stresses in the part that would otherwise be associated with the screw ports. In some embodiments, point stress in a part made by resistive welding may be essentially eliminated. Accordingly, reinforcing structures associated with screw ports need not be used. Accordingly, reinforcing ribs and an increased thickness of the material, at least in the vicinity of the screw ports, need not be used.

One advantage of the absence of the screw ports and associated structure, such as ribs, is that the weight of the first and second weldable members may be substantially reduced. For example, the weight of parts may be reduced by 10-15% and sometimes up to 25%. Therefore, the part may be lighter, and be cheaper to manufacture than prior art parts.

Another advantage of the absence of the screw ports is that at least one of the first and second weldable members, and preferably both, may have an absence of reinforcing ribs. Such embodiments may be advantageous because the material costs and weight associated with the ribs will be obviated. Accordingly, the appliance may be lighter and therefore easier to maneuver.

In a particularly preferred embodiment, the part comprises part of a fluid flow path of an appliance and is also a structural or load bearing member of an appliance, e.g., a cleaning head of a surface cleaning apparatus.

In some embodiments, each of the first and second parts has a perimeter, a web of material extends within the perimeter, the web has an outer surface and at least one of the first and second parts is configured to transmit stresses only in a direction parallel to the outer surface.

In some embodiments, each of the first and second parts has a perimeter and the part further comprises a conductive member extending around the perimeter from a first position to a second position, and the first portion is separated from the second portion by a gap. Accordingly, the electrically conductive wire that is utilized preferably extends continuously along the perimeter of a part to be secured to another part except for the gap. The gap is preferably less than 0.08 inches, more preferably less than 0.04 and, most preferably less than 0.02 inches. Preferably, the gap is larger than 0.001 inches and preferably greater than 0.005 inches.

In alternate embodiments, a gap may not be provided. Alternately, the wire may be coated with a non-electrical conductive material so as to prevent excessive heating at the position where the wire touches itself or another wire, such as where the wire may cross itself. For example, the wire may be covered with an enamel. Alternately, the wire may be coated with a sacrificial material, such as a thermosetting plastic. When heated, the thermosetting plastic will melt and flow between the parts. The thermosetting plastic may be any plastic that with permit bonding of mating surfaces. Preferably, the thermosetting plastic is a plastic that is sufficiently chemically similar to the parts being welded that the parts will bond together and preferably is the same as the parts being welded together.

Alternately, or in addition, a spacer may be positioned between adjacent portions of wire. The spacer maybe provides a sufficient spacing between adjacent wires such that the material at the location of the adjacent wires will not melt too much. The spacer may be sufficiently think to merely prevent the wires from touching, particularly if the wires are uncoated. The spacer may be 0.001 inches think or greater, preferably greater than 0.005 inches thick. The spacer may be made of any material that will melt at elevated temperatures produced by the welding process. Preferably, it is a plastic and more preferably, the same plastic as the parts being welded together. The spacer may be made of any thermosetting plastic that is sufficiently chemically similar to the parts being welded that the parts will bond together and preferably is the same as the parts being welded together.

In some embodiments, the conductive member comprises first and second ends, and the first and second ends are accessible when the part has been formed. Such embodiments may be advantageous because the manufacturer may access the first and second ends to disassemble the part to repair a component, e.g., a motor positioned therein, by merely applying a current through the embedded conductive member. The weldable members may subsequently be re-welded together to form a repaired part.

In some embodiments, a plurality of conductive members extend around the perimeter and at least two of the conductive members are spaced apart by a gap. The gap is preferably less than 0.08 inches, more preferably less than 0.04 and, most preferably less than 0.02 inches.

In some embodiments, a plurality of conductive members extend around the perimeter and a gap is provided between adjacent ends of adjacent conductive members. The gap is preferably less than 0.08 inches, more preferably less than 0.04 and, most preferably less than 0.02 inches.

In some embodiments, the conductive member comprises first and second ends, and the first and second ends are accessible.

In some embodiments, the part comprises a structural member of the vacuum cleaner.

In another broad aspect, a method of making a part of a surface cleaning apparatus is provided. The method comprises (a) applying an electrical current to a conductive member positioned between first and second weldable members to melt a portion of the first and second weldable members proximate the conductive member; and (b) allowing the melted portion to harden while the first and second weldable members are in contact with each other.

In some embodiments, the method further comprises positioning the conductive member along a perimeter of one of the first and second members between first and second positions wherein the first and second positions are separated by a gap less than 0.08 inches prior to applying the electrical current.

In some embodiments, the first and second weldable members contact each other along a common boundary and the method further comprises positioning a plurality of conductive members along the boundary wherein at least two of the conductive members are spaced apart by less than 0.08 inches In some embodiments, after step (b), at least a first portion and a second potion of the conductive member are positioned to be accessible.

In some embodiments, the method further comprises constructing at least one of the first and second weldable members without any screw ports.

In some embodiments, the method further comprises constructing at least one of the first and second weldable members without any reinforcing ribs.

In some embodiments, each of the first and second parts has a perimeter, a web of material extends within the perimeter, and the web has an outer surface. In some such embodiments, the method further comprises constructing at least one of the first and second parts to transmit stresses only in a direction parallel to the outer surface.

In some embodiments, the part includes a metallic component and the method further comprises positioning the metallic component in between the first and second weldable members prior to applying the electric current.

In another broad aspect, a method of disassembling a part of a surface cleaning apparatus is provided. The part comprises at least two weldable members joined together along a boundary by resistive welding, and a conductive member at least partially embedded therein. The method comprises applying an electrical current to the conductive member; and separating the at least two weldable members.

In some embodiments, the at least two weldable members form a housing for a component of the surface cleaning apparatus, and the method further comprises servicing the component (e.g., repairing or replacing a motor). The method may further comprise subsequently resistively welding the weldable members together.

In some embodiments, the method further comprises aligning the at least two weldable members along the boundary, and applying an electrical current to the conductive member whereby the parts are resistively welded together.

In some embodiments, the method further comprises recycling the at least two weldable members.

It will be appreciated that the part may be used in a surface cleaning apparatus, a kitchen appliance, a power tool or a garden tool.

It is preferred to use this process with a part that houses a metallic component. In particular, the method may be used to form a part that houses a component, e.g., a motor. The presence of the metal in the component prevents the use of induction welding since the metal in the component will also be heated by the welding operation. However, in contrast, resistive welding will not heat the metal of the component, only the conductive member, e.g. a wire, which is brought into electrical contact with the power source.

A further advantage of the process is that parts that have a complicated geometry may be easily welded without the need to created a welding jig having a mating geometry, which would be required in sonic welding were used.

BRIEF DESCRIPTION OF THE DRAWINGS

These and other advantages of the present invention will be more fully and particularly understood in connection with the following description of the preferred embodiments of the invention in which.

DETAILED DESCRIPTION OF THE INVENTION

Figure 1:
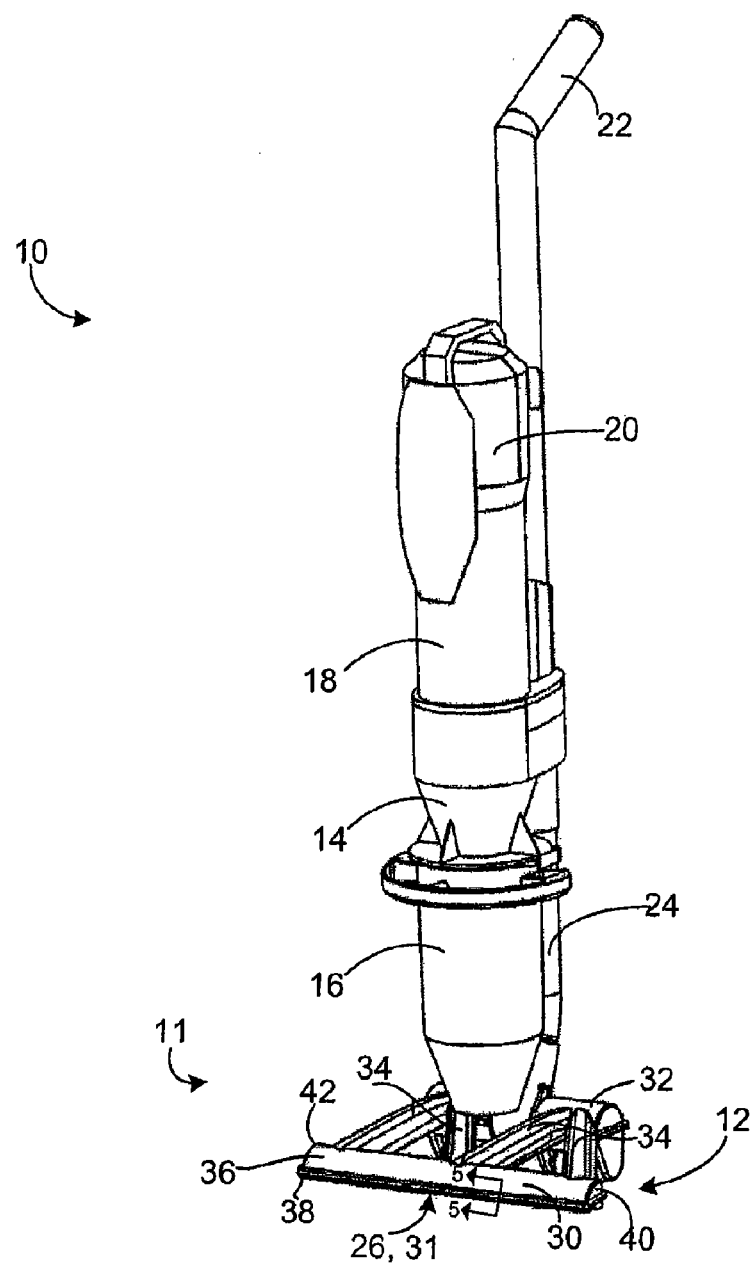
FIG. 1 is a perspective view of a surface cleaning apparatus comprising an embodiment of a surface cleaning head that is manufactured using resistance welding.

Referring to FIG. 1, an exemplary surface cleaning apparatus 10 comprising a part according to the present invention is shown. In the embodiment shown, surface cleaning apparatus 10 is an upright vacuum cleaner having an upright section that comprises a surface cleaning head 12, a cyclone 14, a dirt bin 16, a filter housing 18, a motor housed in a motor housing 20. The upright is mounted to a backbone 24, which includes an up flow conduit extending to cyclone 14, and which includes a handle 22. The surface cleaning head 12 comprises a dirty fluid inlet 26, through which air enters surface cleaning apparatus 10. From the surface cleaning head 12, the dirty air enters the up flow conduit of backbone 24, and is directed upwards towards cyclone 14. In cyclone 14, larger dirt particles are separated from the air, and are deposited into dirt bin 16. The air exits the cyclone 14, and passes through optional filter housing 18, where smaller dirt particles are removed from the air. The clean air is then drawn through the motor housing, and out of clean fluid outlet 28. Accordingly, in the embodiment shown, the fluid flow path is defined by surface cleaning head 12, backbone 24, cyclone 14, filter housing 18, and motor housing 20.

Embodiments of the present invention relate to parts for vacuum cleaners. It will be appreciated that parts of the present invention may be included in various types of surface cleaning apparatuses of various constructions. Thus, although surface cleaning apparatus 10 is an upright vacuum cleaner, a part of the present invention may be used in any type of surface cleaning apparatus including a canister vacuum cleaner, a hand vacuum cleaner, a strap carriable vacuum cleaner, a stick vacuum cleaner, a wet/dry vacuum cleaner, a carpet extractor and the like, and these may be of any design.

Some particular embodiments relate to parts that form a portion of a fluid flow passage of a surface cleaning apparatus. Such parts may include any part that defines a cavity having an inflow port and an outflow port. For example, one or more of cleaning head 12, cyclone 14, filter housing 18, and motor housing 20, or another part which forms a portion of a fluid flow passage may be or incorporate such a part. In some further embodiments, such a part may comprise a structural part of the surface cleaning apparatus, such as backbone 24. For simplicity, an embodiment of the present invention will be described with reference to surface cleaning head 12. However, it will be appreciated that the described methods and apparatus may be modified to suit the particular part.

Referring to FIG. 1, an embodiment of a part 11 of the present invention is shown. In the embodiment shown, part 11 is surface cleaning head 12. Surface cleaning head 12 comprises a cavity defined between the inner surfaces of first and second members 46 and 48, an inflow port 31 (which is the dirty air inlet of surface cleaning head 12), and an outflow port 44, which is the port that connects with the up flow conduit of backbone 24 (see FIG. 2). In the embodiment shown, the cavity comprises a front chamber 30, a rear chamber 32, and a plurality of airflow struts 34 extending therebetween. Airflow struts 34 provide fluid communication between front chamber 30 and rear chamber 32.

In alternate embodiments, wherein part 11 is not a surface cleaning head, the cavity may be otherwise configured. For example, in embodiments wherein the part 11a backbone 24, the cavity may be cylindrical.

In the embodiment shown, front chamber 30 comprises an upper portion 36, a lower portion 38, and opposed sides 40, 42. Inflow port 31 is defined in lower portion 38, and provides the dirty fluid inlet of the surface cleaning apparatus. A rotatably mounted brush may be provided in front chamber 30. Outflow port 44 provides fluid communication between surface cleaning head 12 and backbone 24.

A more detailed description of surface cleaning head 12 may be found in U.S. patent application Ser. No. 11/953,355 (filed on Dec. 10, 2007), which is incorporated herein by reference in its entirety.

Figure 2:
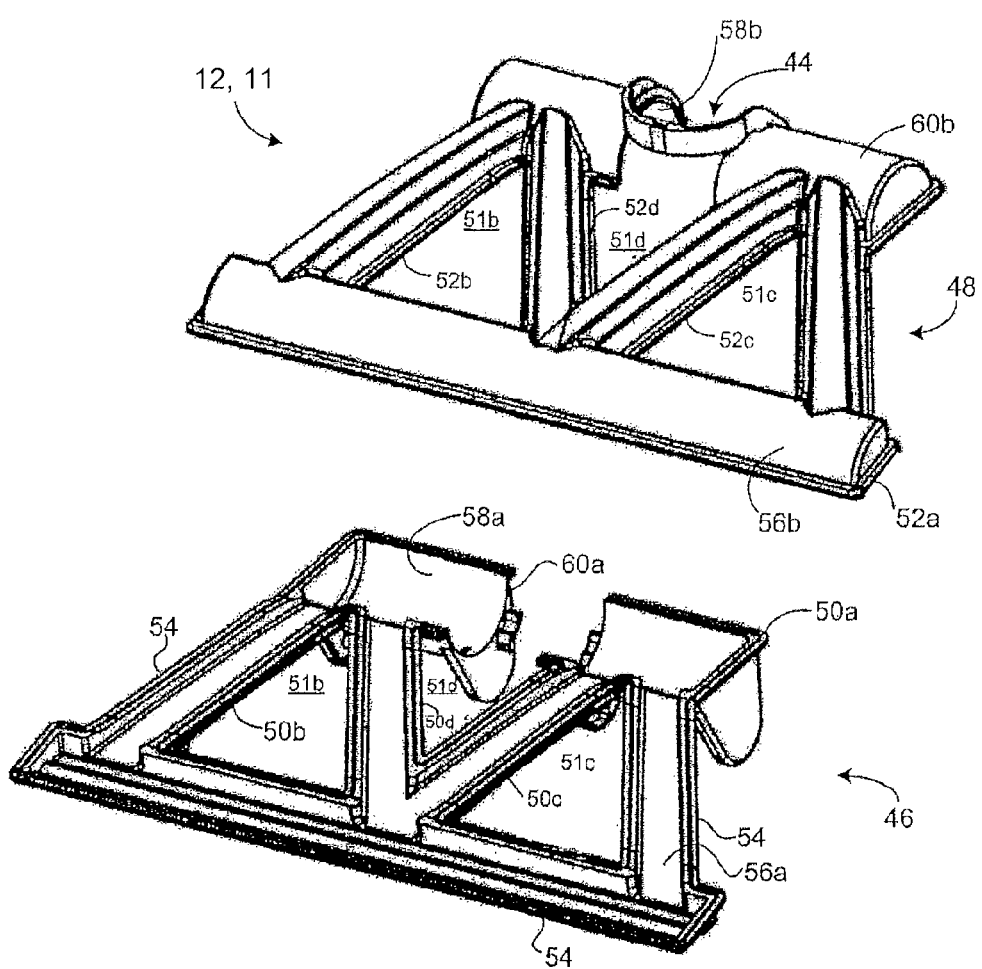
FIG. 2 is an exploded view of the surface cleaning head of FIG. 1.

Referring to FIG. 2, surface cleaning head 12 is fabricated from first 46 and second 48 members, which are resistively welded together to form surface cleaning head 12. In the embodiment shown, surface cleaning head 12 comprises only two members. However, in alternate embodiments, surface cleaning head may comprise additional members, for example third and fourth members, which may be resistively welded to the first and second members. Alternately, first member 46 may comprise two molded parts that are each resistively welded to second member 48. Accordingly, any number of parts may be resistively welded together.

First 46 and second 48 members comprise any weldable composition, e.g., a material that melts when heated, and is preferably a plastic. In the preferred embodiment, first 46 and second 48 members are individually molded and may comprise PVC, polycarbonate, polyethylene, polypropylene, ABS, or any other thermal setting plastic. In the preferred embodiment, first 46 and second 48 members and are formed by injection molding. However, in other embodiments, first 46 and second 48 members are fabricated by rotational molding, vacuum forming and the like.

In the embodiment shown, each of first 46 and second 48 weldable members defines at least one perimeter, along at least a portion of which the first 46 and second 48 members are to be joined. Accordingly, the perimeter of a member is the surface that is to be joined and may be part or all of the circumference of a member. In the exemplified embodiment shown in FIG. 2, first weldable member 46 comprises four perimeters, 50a, 50b, 50c, 50d, and second weldable member 48 comprises four perimeters 52a, 52b, 52c and 52d. Perimeters 50b, 50c, 52b, and 52c extend around central voids or openings 51b and 51c. Perimeters 50d and 52d extend partially around central void 51d. Perimeters 50a and 52a extend partially around substantially the entirety of surface cleaning head 12. Perimeter 50a is to be joined to perimeter 52a along the entire lengths thereof, perimeter 50b is to be joined to perimeter 52b along the entire lengths thereof, perimeter 50c is to be joined to perimeter 52c along the entire lengths thereof, and perimeter 50d is to be joined to perimeter 52d along the entire lengths thereof. It will be appreciated that when these perimeters are resistively welded together, that members 46, 48 are secured together to define a fluid conduit with the only openings being inlet 31 and outlet 44. Accordingly, it will be appreciated that as used herein, the term perimeter refers to a boundary which extends at least partially around or about a component and which may or may not be closed.

In the embodiment shown, each perimeter comprises a plurality of edges 54 that are connected together to define a path that is to be secured to a mating edge. In alternate embodiments, one or more perimeters may be substantially circular or rounded, and may therefore comprise only a single edge. In the embodiment shown, edges 54 have a width of between about 0.5 cm and about 1.5 cm. However, in other embodiments, edges 54 may have another width.

In the embodiments shown, members 46 and 48 are joined along the entirety of each perimeter. In alternate embodiments, the weldable members may be joined along only a portion of each perimeter. For example, in embodiments wherein part 11 is backbone 24, members 46 and 48 may comprise first and second longitudinally extending halves of an open-ended cylinder. In such an embodiment, each perimeter may comprise two straight edges, and two semi-circular edges, and the members may be joined only along the straight edges, wherein the straight edges are the mating edges or the edges to be joined and the material extending between the straight edges of one half that defines the semi cylindrical shape is the web of material that forms the semi cylindrical shape.

When the perimeters are joined, a cavity is formed defined by a web that is provided between the perimeters. For example, in some embodiments, a web 56a, 56b of plastic extends within some of the perimeters or between some of the perimeters to define an inner surface 58a, 58b, and an outer surface 60a, 60b of each of first 46 and second 48 weldable members. In the embodiment shown, webs 56 extend inwardly from perimeters 50a and 52a. Web 56a extends between perimeter 50a and perimeters 50b, 50c, and 50d, and web 56b extends between perimeter 52a and perimeters 52b, 52c, and 52d. Voids 51b-51d may also extend within perimeters 50b, 50c, 50d, and 52b, 52c, and 52d.

In order to form surface cleaning head 12, first 46 and second 48 members are resistively welded together. In the embodiment shown, first 46 and second 48 members are resistively welded along each perimeter 50a, 50b, 50c, 50d, 52a, 52b, and 52c, 52d. In alternate embodiments, first 46 and second 48 members may be resistively welded along only some of the perimeters. A method for resistively welding first 46 and second 48 members will presently be described, with reference to FIGS. 3-6.

Figure 3:
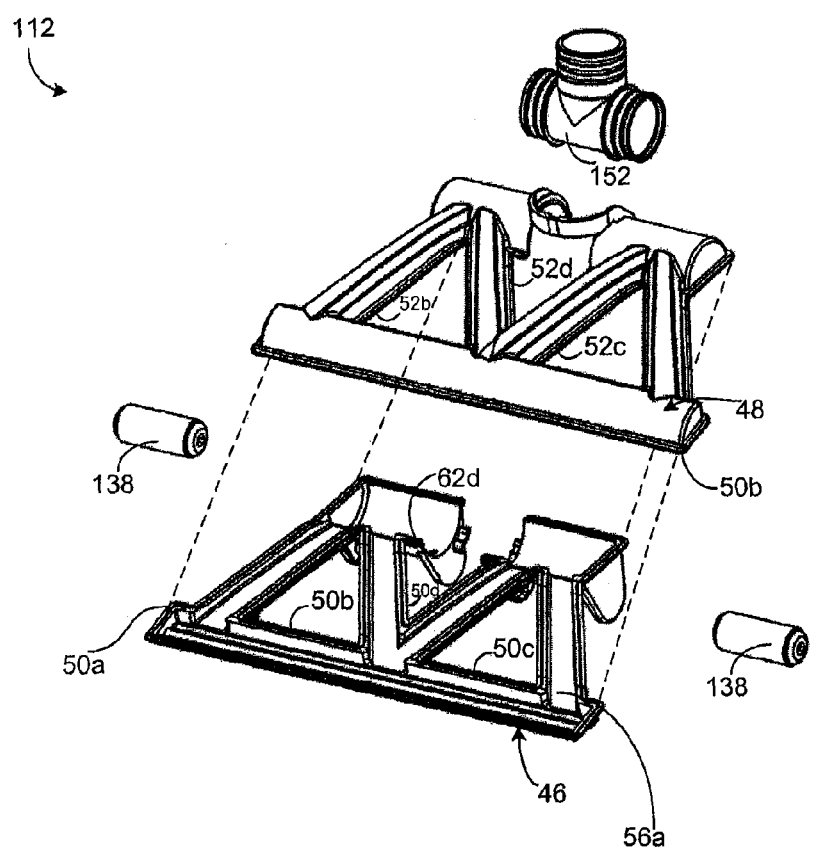
FIG. 3 is a perspective view of the surface cleaning head of FIG. 1, showing an embodiment of a step of the manufacture of the part.

Referring to FIG. 3, in a first step of resistively welding first 46 and second 48 weldable members, first 46 and second 48 members are aligned along the perimeters or edges to be joined. In the embodiment shown, first 46 and second 48 members are aligned along perimeters 50a, 50b, 50c, 50d, 52a, 52b, 52c, and 52d. Any components to be housed within surface cleaning head 12, such as one or more brushes or wheels 138, and one or more pivoting connectors 152, may be placed between first 46 and second 48 members before or after the parts are aligned.

In some embodiments, as previously mentioned, the part for the vacuum cleaner may comprise a motor housing, or another housing which houses a metallic component. In such embodiments, the metallic component may be placed between first 46 and second 48 members prior to resistively welding the first 46 and second 48 members.

Figure 4:
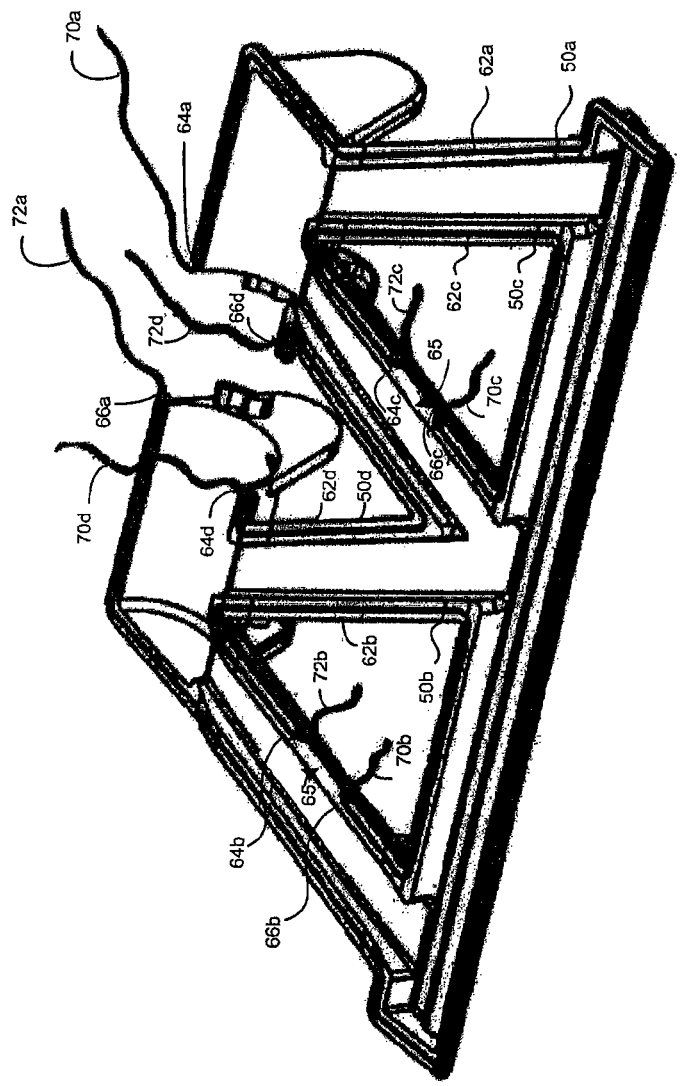
FIG. 4 is an enlarged view of one of the weldable members shown in FIG. 3.

At least one conductive member, for example a wire 62, is positioned between the first 46 and second 48 weldable members, along the perimeters or edges to be joined, as exemplified in the enlarged view of FIG. 4. In the embodiment shown, a first wire 62a is placed between perimeters 50a and 52a, a second wire 62b is placed between perimeters 50b and 52b, a third wire 62c is placed between perimeters 50c and 52c, and a fourth wire 62d is placed between perimeters 50d and 52d. Wires 62 are positioned such they extend along each perimeter 50 from a first position 64a-d to a second position 66a-d. The wires may be embedded in a part or may be placed on the top surface or a perimeter As will be appreciated, perimeters 50a and 52a and perimeters 50d and 52d do not form a closed loop. Accordingly, first position 64a, 64d and second position 66a, 66d may be, and are preferably, at the ends of each perimeter. However, perimeters 50b and 52b, and perimeters 50c and 52c define a closed loop. In such a case, first position 64b, 64c and second position 66b, 66c are preferably spaced apart to define a gap 65 between the portions of the wire 62 at first 64 and second 66 positions. Gap 65 may serve to prevent the creation of a short circuit between the portions of wire at positions 64 and 66. Alternately, or in addition, the wire or wires may be coated and/or they may be separated by a spacer.

In some embodiments, gap 65 is sized such that when a current is passed through wire 60, the portions of at least one of first 46 and second 48 weldable members in gap 65 will melt sufficiently such that a fluid tight seal is created in gap 65. The gap is preferably less than 0.08 inches, more preferably less than 0.04 and, most preferably less than 0.02 inches If there is no gap, or if positions 64, 66 are too close together, then an excess of plastic may melt during the welding process, resulting in an incomplete seal being formed (i.e., if may not be fluid tight) or a structural weakness may be created in the location of position 64, 66. The advantage of providing a gap 65 is that excessive heating is not provided in that region. For example, if the ends of the wire at positions 64, 66 abutted, additional heat would be provided adjacent the ends such that too much of the plastic in that region may melt to such an extent that the plastic may flow and insufficient plastic may be provided at a location to provide an air tight or fluid tight seal. Accordingly, if the wire forms a loop, as exemplified in FIG. 8, the ends of the wire on the perimeter are preferably spaced apart a sufficient amount so that the plastic therebetween melts a sufficient amount to provide a full seal when current is provided through wire 62.

In the embodiments shown, a single conductive member is placed between each of the perimeters or edges that are to be joined together. However, in alternate embodiments, more than one conductive member may be placed between each of the perimeters that are to be joined together. In such embodiments, the conductive members may be positioned such that they are generally parallel to each other, and such that they are spaced apart by about by less than 0.08 inches, more preferably less than 0.04 and, most preferably less than 0.02 inches.

In the embodiment shown, wires 62 are positioned such that a first portion 70 of wire 62 adjacent position 64, and a second portion 72 of wire 62 adjacent position 66 are accessible when first 46 and second 48 members are joined. For example, as exemplified in FIG. 4, first portion 70 and second portion 72 may extend out beyond the perimeter of members 46, 48 after the welding process is complete. It will be appreciated that, in an alternate embodiment, portions 70, 72 may be recessed inside the welded part and accessible through ports the extend from the outer surface of the part to the ends of the wires.

After wires 60 have been positioned, first 46 and second 48 members are positioned in contact with each other along the common boundary that is to be welded. In the embodiment shown, the common boundary extends along perimeters 50a, 50b, 50c, 50d, 52a, 52b, 52c, and 52d. However, as previously mentioned, the common boundary may comprise only a single edge of a perimeter. In some embodiments, a vice or other holding device may be used to securely hold first 46 and second 48 members in place. Suitable pressure may be applied.

Figure 5A:
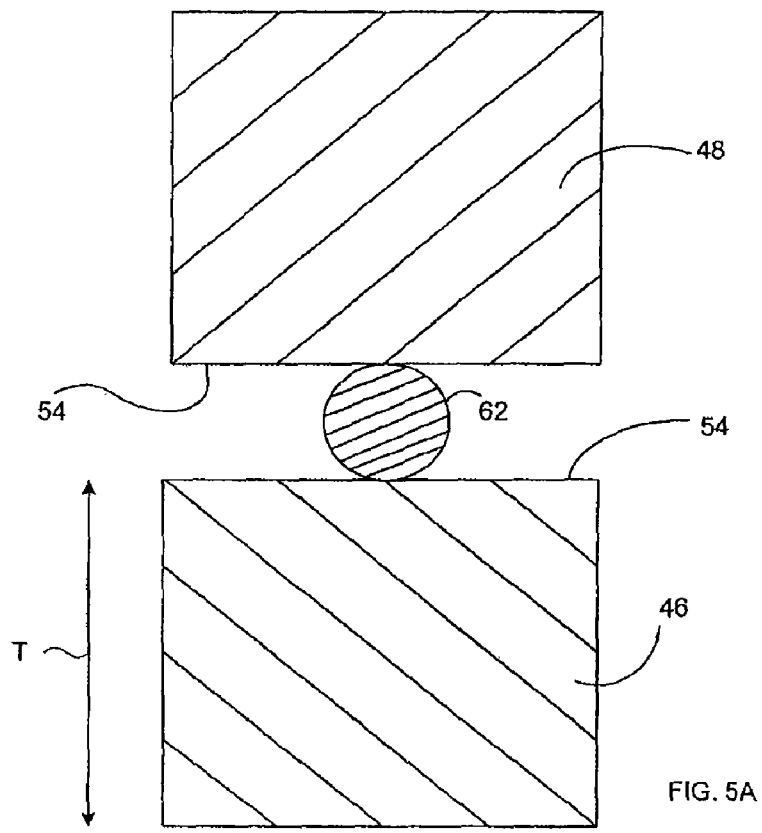
FIGS. 5A and 5B are cross sections taken along line 5-5 in FIG. 1, prior to applying current to a conductive member, of alternative configurations for the adjoining surfaces of the weldable members exemplified in FIG. 3; and, FIG. 6 is a cross section taken along line 5-5 in FIG. 1, after applying current to a conductive member.
Figure 5B:
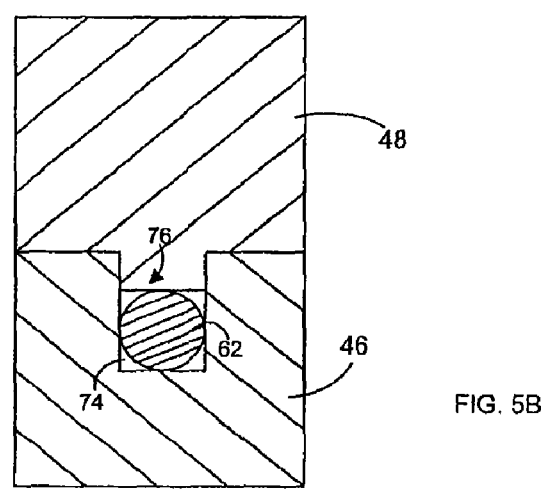

In some embodiments, as shown in FIG. 5A, the edges of each perimeter may be substantially flat, such that wire 60 is substantially sandwiched between members 46 and 48. In other embodiments, as shown in FIG. 5B, a groove 74 or female engagement member may be provided on the edge 54 of one of members 46 and 48, and a rail 76 or male engagement member may be provided on the edges of the other of members 46 and 48, such that the wire 60 is sandwiched in the groove 74 when the male and female members are interengaged. Such embodiments may be advantageous because the surface area of the members 46, 48 in contact with the wire may be increased.

A voltage is then applied across each wire 62, such as by connecting the exposed portions 70, 72 to a power source. In some embodiments, the power source may be a variable voltage transformer with an AC or DC output, and preferably DC. As the voltage is applied, the wire 62 will begin to heat up. As the wire heats up, the plastic adjacent each wire 62 will begin to melt. Furthermore, the plastic at optional gap 65 will begin to melt. Accordingly, the members 46 and 48 may be joined continuously along the perimeters thereof, including at gap 65, and an airtight seal may be provided between members 46 and 48. It will be appreciated that the current may be applied concurrently with bring the members 46, 48 into contact with each other or prior thereto or thereafter.

Figure 6:
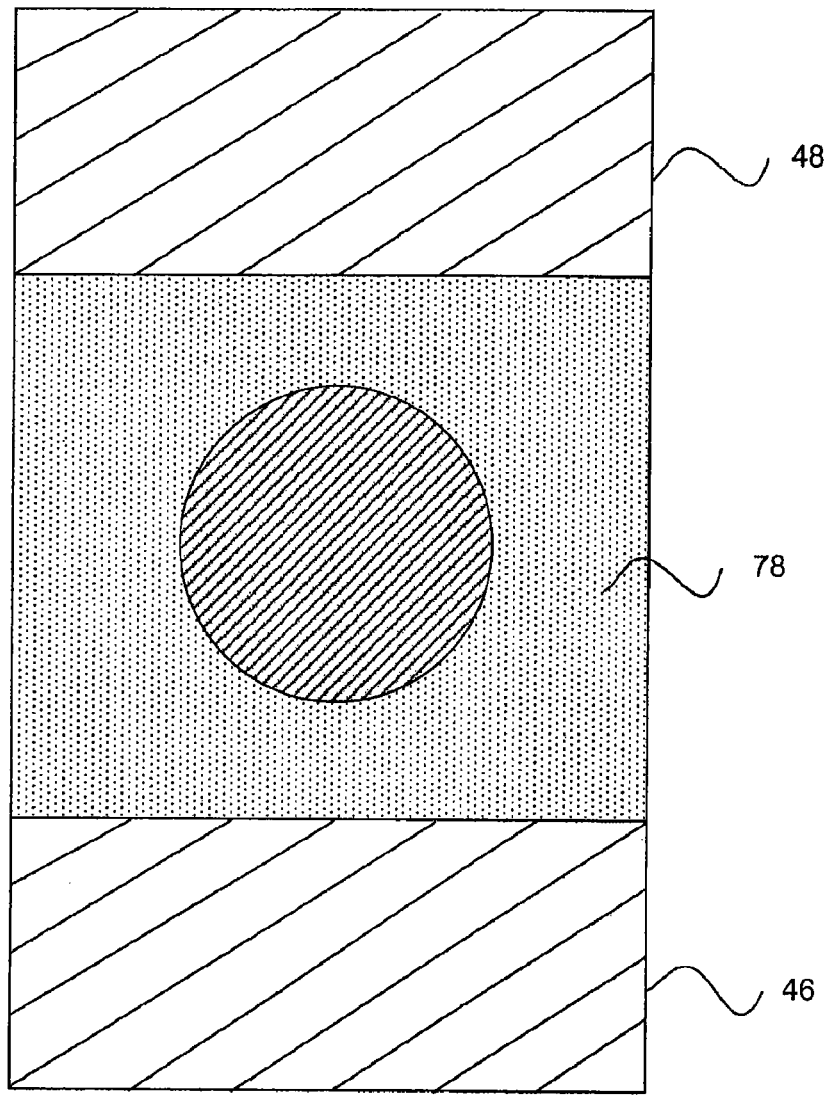
FIG. 6A is a cross section taken along line 5-5 in FIG. 1 of a cleaning head made using the embodiment of FIG. 5B, after applying current to a conductive member.

After a period of time, for example between about 2 and 20 seconds, preferably about 5 seconds, the application of voltage may be terminated. When the application of voltage has been stopped, the weldable members may be held in contact with each other and allowed to harden. That is, the weldable members will begin to cool, and the melted portions 78 will harden and become welded together, with wires 62 embedded therein, as shown in FIG. 6.

Figure 6A:
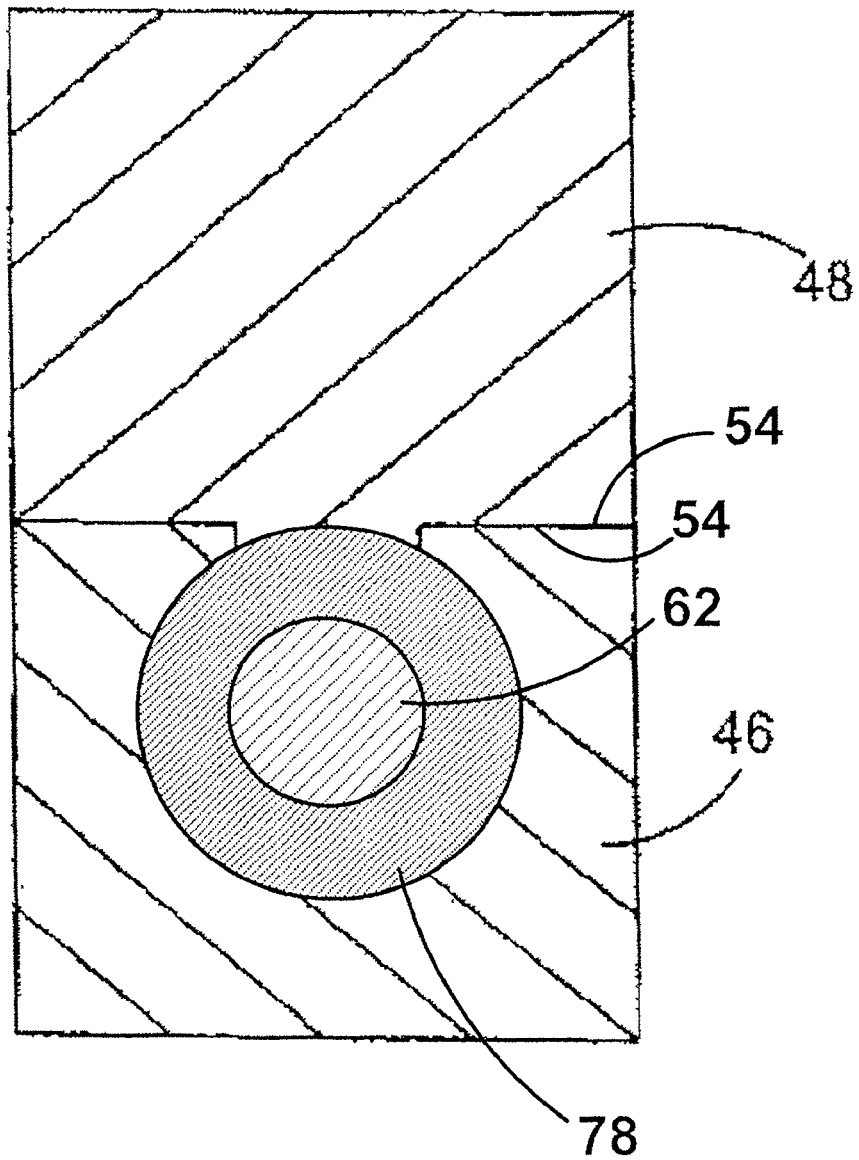

If members 46, 48 are in the configuration of FIG. 5B, then after cooling, the weldable members will be secured together by melted portion 78. Wire 62 will remain embedded in member 46. As noted previously, if an excess of plastic is melted during the welding process, then structural weakness may be created. Therefore, as exemplified in FIG. 6A, the melted portions do not extend to the sidewalls of members 46, 48 and edges 54 are still defined towards the sidewalls.

In some embodiments, after the first 46 and second 48 members have been resistively welded, a user may clip or cut wires 62, such that the exposed portions 70 and 72 are not exposed in the part 11 after the welding process has been carried out. However, in the preferred embodiments, the exposed portions 70 and 72 remain accessible in the final product. That is, rather than clipping or cutting off exposed portions 70 and 72, they may be, for example, coiled. Alternatively, one or both of parts 46 and 48 may comprise a groove or notch on outer surface 60 into which portions 70, 72 can be tucked, or they may be located in ports. Such embodiments may allow for easy repair of the part.

Surface cleaning head 12 may then be assembled with the remaining parts of surface cleaning apparatus 10. As surface cleaning apparatus 10 is used, various forces and pressures will be applied to surface cleaning head 12. For example, in use, surface cleaning head may contact or strike one or more walls. However, because members 46 and 48 may be joined continuously along the perimeters thereof without any supplemental mechanical fasteners, the stresses will be distributed substantially equally along the perimeters. Therefore, surface cleaning head 12 will tend to act as a unibody part and need not be provided with support ribs to aid in the distribution of forces. Accordingly, without being limited by theory, it is understood that stresses applied to surface cleaning head 12 will be transmitted in a direction generally parallel to outer surfaces 60a, 60b, rather than inwardly towards support ribs.

Over the course of the lifetime of surface cleaning apparatus 10, it may be required to repair, replace, or service various parts of surface cleaning apparatus 10. For example, it may be required to repair a brush of surface cleaning head, or to replace a motor. Alternatively, at the end of the lifetime of surface cleaning apparatus 10, it may be desired to recycle the various parts of surface cleaning apparatus 10, including surface cleaning head 12. Embodiments of the present invention provide a method for disassembling a part of a surface cleaning apparatus, such that, for example, the part or the contents of the part can be repaired or replaced, or such that one or more components of the surface cleaning apparatus may be recycled. A method of disassembling a part of the present invention will presently be described with reference to surface cleaning head 12. However, the method may be used for any part of an apparatus that is resistively welded together.

In a first step of disassembling surface cleaning head 12, the user may move portions 70, 72 of wire 62 to an exposed position, if required. For example, the user may remove or dislodge wires 62 from a groove such that portions 70 and 72 are exposed. Once the wires are exposed, or if the ends 70, 72 of the wire can be accessed while the ends are recessed in part 11, a voltage may then be applied to wire 62 via portions 70 and 72. As the voltage is applied, the wire 62 will begin to heat up. As the wire heats up, the plastic at the joined edges will begin to melt. Additionally, depending on the configuration of wires 62, the plastic at any gaps 65 may begin to melt. As the plastic melts, the user may apply separate members 46 and 48.

When the members are separated, any components held or contained in part 11 may be accessed. The component may be repaired, replaced, or otherwise serviced. Alternatively, one or more components may be recycled or sent for recycling, including the first and second weldable members.

In embodiments wherein the component of the part is repaired or replaced, part 11 may be re-assembled after the component is repaired or replaced. In order to re-assemble the part, the at least two weldable members 46, 48 are realigned along the perimeters to be joined, any components between the weldable members 46, 48 are provided therein, any conductive member 62 between the weldable members 46, 48 may be positioned along the perimeter, and an electrical current is applied to the conductive member to resistively weld the members together.

It will be appreciated that conductive member 62 need not be a wire but may be any member that is capable of heating plastic due to the passage of current therethrough. Conductive member 62 may be embedded in a member 46, 48 or it may be a separate element that is positioned between mating members 46, 38 prior to the welding operation.

Figure 7:
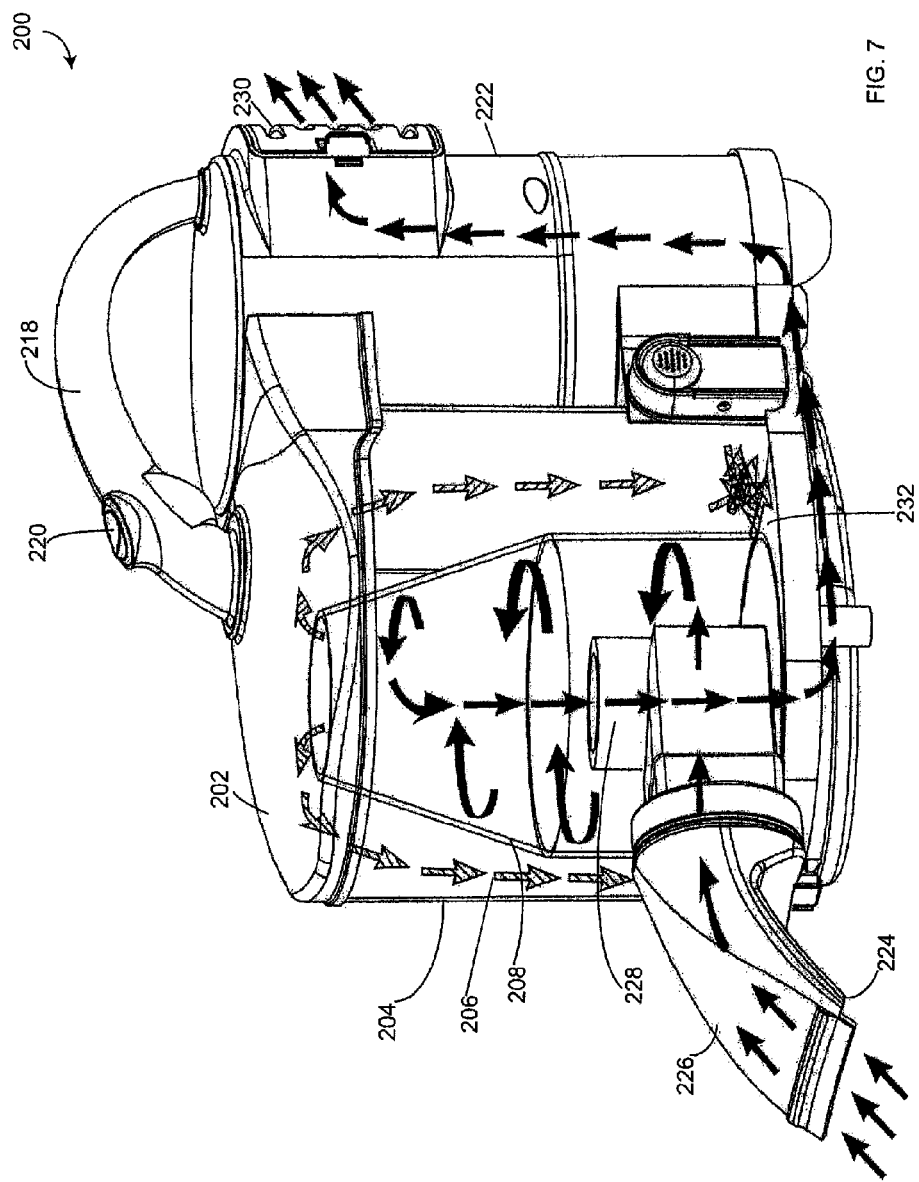
FIG. 7 is a schematic drawing of a handheld surface cleaning apparatus showing the airflow passage therethrough.

In accordance with another embodiment, FIG. 7 shows a handheld cleaning apparatus 200 wherein two parts are exemplified as being assembled by resistive welding. Handheld cleaning apparatus 200 has a handle 218 and on/off switch 220 to activate a suction motor inside second housing 222. In use, the suction motor draws air through a path shown by the solid arrows, wherein dirty air enters dirty air inlet 224 of surface cleaning nozzle 226, passes through cyclone 208 within first housing 204, enters vortex finder 228 within cyclone 208, and finally passes through filters and the suction motor within second housing 222 before exiting out of clean air outlet 230. Dirt entrained in the air which enters cyclone 208 separates from the flow at the top of the cyclone 208, shown by the hashed arrows, and is deposited on the floor 232 of collection chamber 206.

Figure 8:
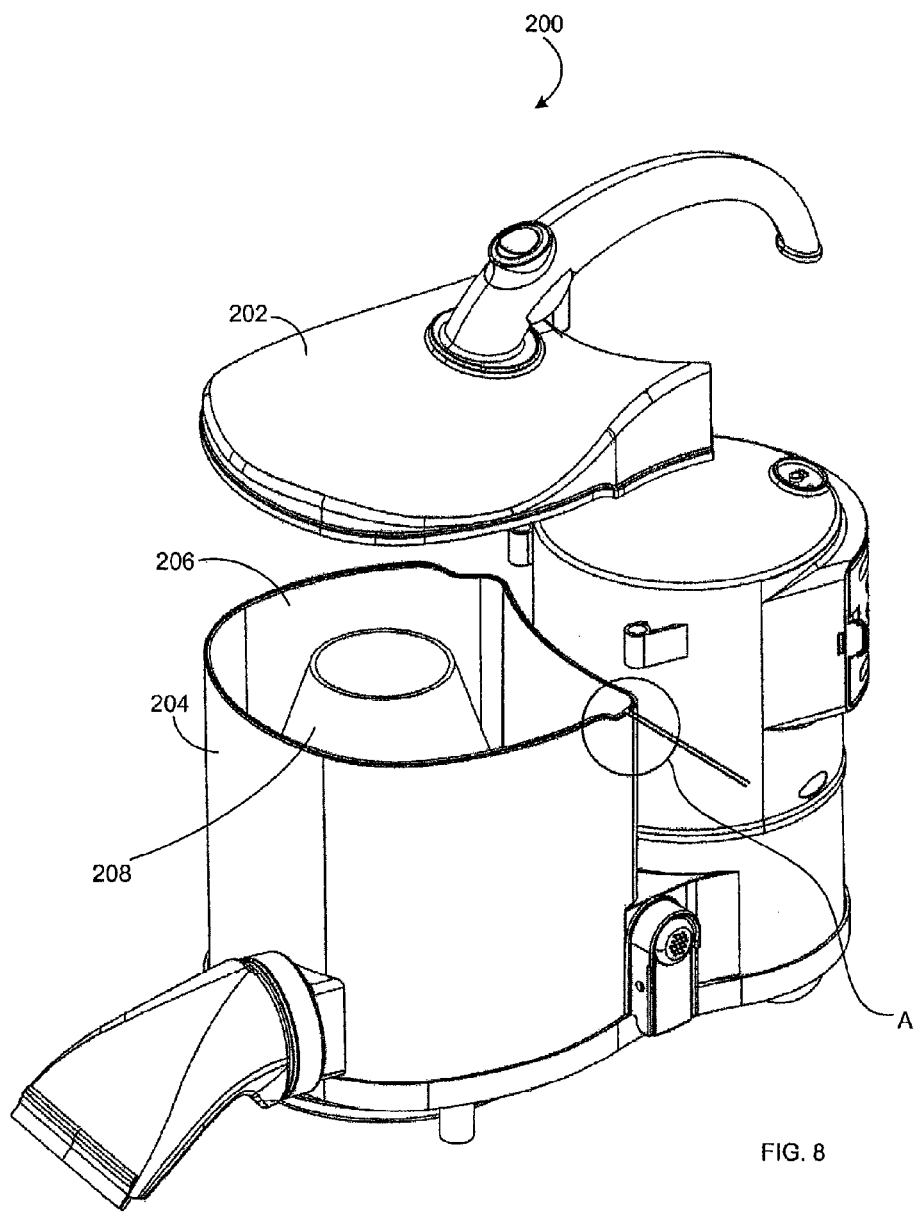
FIG. 8 is a perspective view of the handheld surface cleaning apparatus of FIG. 7 with the lid removed showing the conductive member provided to permit the lid to be secured to the dirt collection chamber by resistive welding; and, FIG. 9 is an enlargement of area A of FIG. 8.
Figure 9:
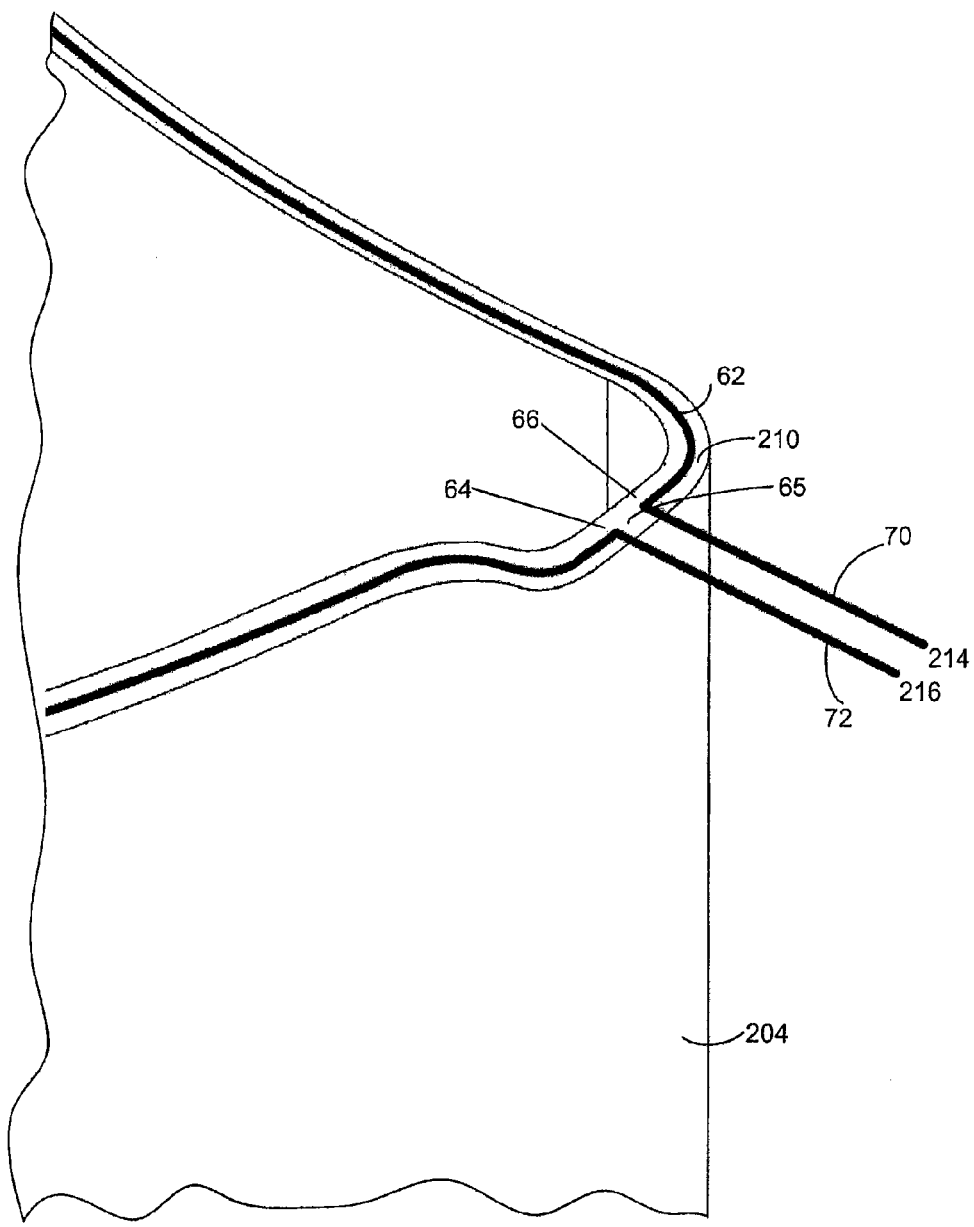

As exemplified in FIGS. 8 and 9, at least two parts of the handheld surface cleaning apparatus 200 are assembled by resistive welding. In this embodiment, a lid 202 closes first housing 204 providing a fluid tight seal along top surface 210 of first housing 204 and is resistively welded thereto. Accordingly, a conductive member, e.g., wire 62 having terminal ends 214 and 216 on portions 70, 72 is provided along top surface 210, which defines the perimeter of housing 204 that is to be joined to the perimeter of lid 202. Preferably, wire 62 is provided in a groove provided in top surface 210, as exemplified in FIG. 5B. In accordance with such an embodiment, the top of wire 62 is preferably flush with or below top surface 210. Alternatively, a portion of wire 62 may extend upwardly from top surface 210 and may be received in a groove in the part to be secured to top surface 210.

In order to secure the parts together (e.g. lid 202 and first housing 204), the parts may be brought into contact prior to or subsequent to terminals 214 and 216 being connected to an electrical source (preferably DC) and electrical current being applied for a sufficient time to weld lid 202 and first housing 204 together. It will be appreciated that as electrical current is applied through wire 62, that wire 62 will heat up thereby melting the surrounding plastic. This permits a complete airtight or fluid tight seal to be formed between lid 202 and first housing 204.

Other details and embodiments of the resistive weld, its composition, advantages and uses, such as for example conductive member gaps, and apparatus disassembly, repair and recycling, are substantially the same as described with reference to FIGS. 1 to 6.

It will be appreciated that certain features of the invention, which are, for clarity, described in the context of separate embodiments or separate aspects, may also be provided in combination in a single embodiment. Conversely, various features of the invention, which are, for brevity, described in the context of a single embodiment or aspect, may also be provided separately or in any suitable sub-combination.

Although the invention has been described in conjunction with specific embodiments thereof, if is evident that many alternatives, modifications and variations will be apparent to those skilled in the art. Accordingly, it is intended to embrace all such alternatives, modifications and variations that fall within the spirit and broad scope of the appended claims. In addition, citation or identification of any reference in this application shall not be construed as an admission that such reference is available as prior art to the present invention.

I claim:

1. A resistively welded part for an appliance prepared using:
    (a) a first weldable member having a weldable portion and a male engagement member extending outwardly from a first abutment surface; and,
    (b) a second weldable member having a weldable portion, a second abutment surface and a female engagement member defining an opening extending inwardly from the second abutment surface and configured to interengage with the male engagement member, wherein in the resistively welded part, at least one conductive member is disposed in the female engagement member and is recessed inwardly from the second abutment surface, the at least one conductive member extends along the weldable portions from a first position to a second position.

2. The part of claim 1, wherein the first and second positions are separated by a gap less than 0.08 inches.

3. The part of claim 1, wherein a plurality of conductive members extend around the weldable portions and at least two of the conductive members are spaced apart by a gap less than 0.08 inches.

4. The part of claim 1, wherein the conductive member comprises first and second ends, and wherein the first and second ends are accessible when the part has been formed.

5. The part of claim 1, wherein the part comprises a structural member of the vacuum cleaner.

6. The part of claim 1, wherein the conductive member has a non-electrical conductive coating.

7. The part of claim 1, wherein at least one of the first and second weldable members has an absence of screw ports.

8. The part of claim 1, wherein at least one of the first and second weldable members have an absence of reinforcing ribs.

9. The part of claim 1, wherein the weldable portions define a perimeter.

10. The part of claim 1, wherein the appliance is a surface cleaning apparatus, a kitchen appliance, a power tool or a garden tool.

11. The part of claim 1 wherein the male engagement member comprises a rail and the female engagement member comprises a groove and a conductive member is positioned in the groove.

12. The part of claim 11 wherein the conductive member is positioned in the female engagement member prior to the weldable portions being resistively welded together.

13. The part of claim 1 wherein the first and second weldable parts are plastic and the male and female engagement members interface at a perimeter defined by the first and second abutment surfaces.

14. The part of claim 10, wherein the part is a structural member of the appliance.

* * * * *